(12) United States Patent
Miyashita et al.

(10) Patent No.: US 7,023,203 B2
(45) Date of Patent: Apr. 4, 2006

(54) ABSOLUTE MAGNETIC ENCODER

(75) Inventors: Kunio Miyashita, Minamiazumi-gun (JP); Junji Koyama, Minamiazumi-gun (JP); Muneo Mitamura, Minamiazumi-gun (JP)

(73) Assignee: Harmonic Drive Systems Inc., Tokyo (JP)

( * ) Notice: Subject to any disclaimer, the term of this patent is extended or adjusted under 35 U.S.C. 154(b) by 0 days.

(21) Appl. No.: 10/904,734

(22) Filed: Nov. 24, 2004

(65) Prior Publication Data

US 2005/0127906 A1    Jun. 16, 2005

(30) Foreign Application Priority Data

Dec. 15, 2003 (JP) .............................. 2003-415911

(51) Int. Cl.
*G01B 7/30* (2006.01)

(52) U.S. Cl. ................................. 324/207.25; 324/260

(58) Field of Classification Search ............... None
See application file for complete search history.

(56) References Cited

U.S. PATENT DOCUMENTS

| 4,262,526 A | * | 4/1981 | Makita et al. ................. 73/116 |
| 4,677,377 A | * | 6/1987 | Takahashi et al. ...... 324/207.12 |
| 4,694,688 A | * | 9/1987 | Takahashi et al. ............. 73/116 |
| 4,774,464 A | * | 9/1988 | Kubota et al. .......... 324/207.25 |

* cited by examiner

*Primary Examiner*—Bot Ledynh
*Assistant Examiner*—Reena Aurora
(74) *Attorney, Agent, or Firm*—Buchanan Ingersoll PC

(57) ABSTRACT

The encoder rotor of an absolute magnetic encoder mounted on a servomotor shaft has a first drum of a bipolar magnet, and a second drum with a Q-bit multipolar magnetic pole track and a reference track. A signal processor generates absolute signals on the basis of detected signals, which differ in phase by 90° and in which a single rotation represents a single period, from X-phase and Y-phase magnetic sensors disposed facing the first drum, and on the basis of A- and B-phase signals, which differ in phase by 90°, and a reference signal obtained from A-, B-, and Z-phase magnetic sensors disposed facing the second drum. Even if the number of bits Q of the multipolar magnetic pole track is increased in order to enhance the resolution, the number of magnetic pole tracks does not need to be increased, and higher resolution can therefore be obtained without increasing the axial length.

3 Claims, 10 Drawing Sheets

US 7,023,203 B2

ABSOLUTE MAGNETIC ENCODER

BACKGROUND OF THE INVENTION

1. Field of the Invention

The present invention relates to an absolute magnetic encoder for generating absolute signals that indicate an absolute rotational position of a servomotor shaft or other rotational body, and more particularly relates to an absolute magnetic encoder capable of generating high-resolution absolute signals without increasing the number of magnetic pole tracks formed on an external peripheral surface of a magnetic drum and increasing the axial length.

2. Description of the Related Art

FIGS. 9A and 9B are a front view and side view showing a configuration of a detection portion of a commonly known absolute magnetic encoder. As shown in the drawings, N tracks, or four magnetic pole tracks 102 to 105 ranging from $2^0$ to $2^3$ are aligned in the direction of a drum axis 101a on the external peripheral surface of a magnetic drum 101 fixed to the motor shaft of the measurement object or another rotational body. Hall sensors or other magnetic sensors 202 to 205 are disposed facing the magnetic pole tracks 102 to 105, respectively. Shown in FIG. 10 are bit signals for each digit obtained from the magnetic sensors 202 to 205 for these digits.

In an absolute magnetic encoder with this configuration, when the number of bits is increased in order to enhance the resolution, the number of tracks increases proportionately and the axial length of the magnetic drum 101 increases as well. This becomes an impediment to reducing the size and weight of a high-resolution absolute magnetic encoder.

SUMMARY OF THE INVENTION

A main object of the present invention is to provide an absolute magnetic encoder that can produce high resolution without increasing the number of magnetic pole tracks formed on the external peripheral surface of a magnetic drum.

To solve the above and other problems, an absolute magnetic encoder of the present invention has a rotor provided with first and second drums fixed coaxially to a rotational member to be measured; a bipolar magnet formed on an external peripheral surface of the first drum; a multipolar track provided with Q-bit (where Q is a positive integer) magnetic poles formed at equiangular intervals on an external peripheral surface of the second drum; a reference track provided with Z (where Z is a positive integer) reference magnetic poles formed at equiangular intervals on the external peripheral surface of the second drum; an X-phase magnetic sensor and a Y-phase magnetic sensor which are disposed facing the external peripheral surface of the first drum and which output an X-phase signal and Y-phase signal that differ in phase by 90°; an A-phase magnetic sensor and a B-phase magnetic sensor which are disposed facing the external peripheral surface of the multipolar track and which output an A-phase signal and B-phase signal that differ in phase by 90°; a Z-phase magnetic sensor which is disposed facing an external peripheral surface of the reference track and which outputs a reference signal for indicating a position of the reference magnetic poles; a first rotor angle computing circuit for computing with P bits (precision $\alpha$) a rotational angle of the rotor on the basis of the X-phase signal and Y-phase signal; a second rotor angle computing circuit for computing with Q bits (precision $\beta(>\alpha)$) the rotational angle of the rotor on the basis of the computational results of the first rotor angle computing circuit and on the basis of the A-phase signal, B-phase signal, and Z-phase signal; and an absolute signal generating circuit for generating an absolute signal that indicates an absolute rotational position of the rotor on the basis of the computational results of the first and second rotor angle computing circuits.

Here, the absolute signal generating circuit may be configured so as to generate the absolute signal on the basis of the computational results of the first rotor angle computing circuit and on the basis of the A- and B-phase signals in an interval of time beginning from the start of rotation of the rotor until the time when the first reference signal is output, to correct the absolute rotational angle on the basis of the reference signal at the time when the reference signal is output, and to generate the absolute signal on the basis of the computational results of the second rotor angle computing circuit after the reference signal has been output.

Also, the first drum and the second drum may be structured as separate members or formed as a single magnetic drum.

In the present invention, X-phase and Y-phase signals which differ in phase by 90° and in which a single rotation represents a single period are generated using a bipolar magnet, and the absolute position of the rotor during initial operation can be detected using these signals and the A- and B-phase signals until the reference signal is generated. After the reference signal has been generated, the absolute position of the rotor can be detected using the X- and Y-phase signals together with the A- and B-phase signals and the reference signal.

Therefore, even if the number of bits of a multipolar track for obtaining A- and B-phase signals is increased to enhance the resolution, the number of magnetic pole tracks does not need to be proportionally increased, as is the case with the prior art. A high-resolution absolute magnetic encoder can thereby be obtained without an increase in the axial length.

DESCRIPTION OF THE PREFERRED EMBODIMENTS

Described below with reference to the drawings is an example of a servomotor provided with an absolute magnetic sensor to which the present invention has been applied.

Figure 1:
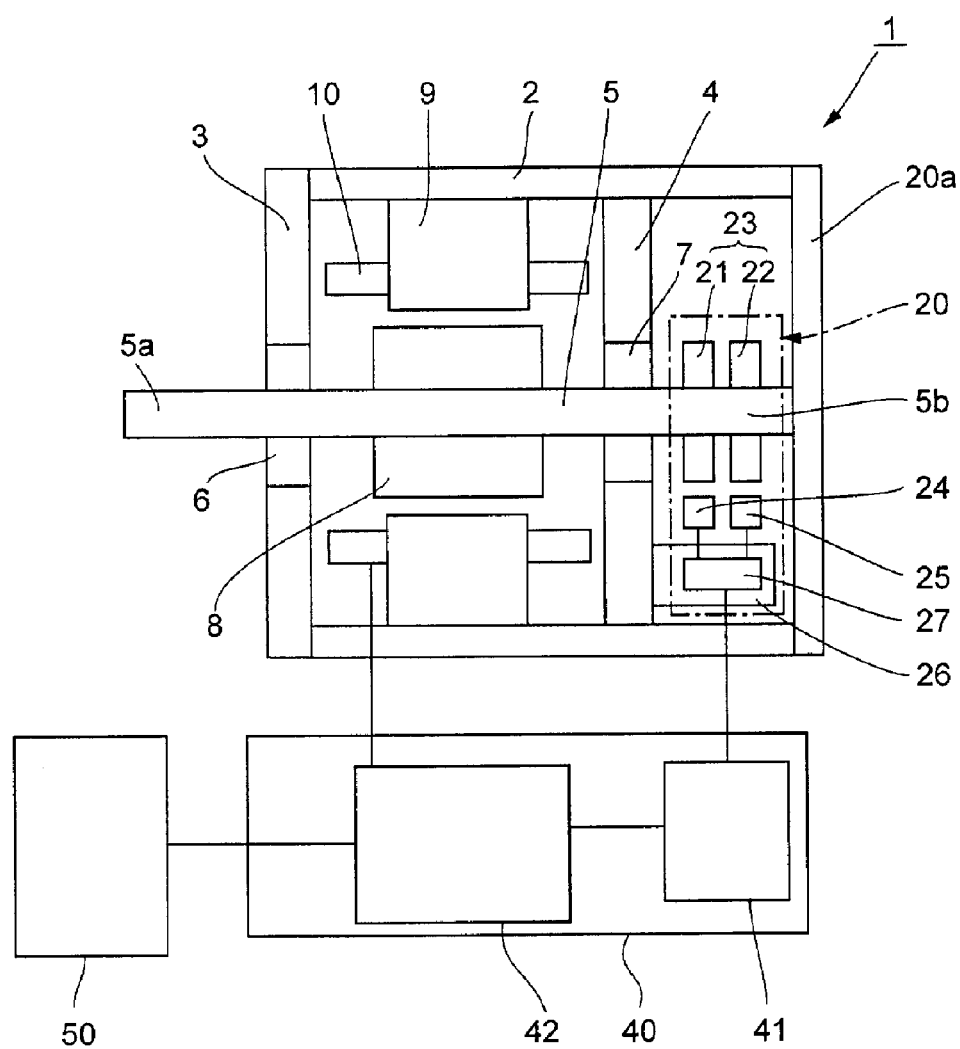
FIG. 1 is a schematic diagram showing a servomotor to which the present invention has been applied.

FIG. 1 is a schematic diagram showing a servomotor in accordance the present invention. The basic configuration of a servomotor 1 is the same as that of a common servomotor. Both ends of a cylindrical motor housing 2 are sealed with end brackets 3 and 4, and a motor shaft 5 is disposed so as to completely pass through a center portion of the end brackets 3 and 4. The motor shaft 5 is rotatably supported by the end brackets 3 and 4 via bearings 6 and 7. A motor rotor 8 is integrally formed in a coaxial state in a portion of the motor shaft 5 inside the motor housing 2, and a motor stator 9 is fixed to an internal peripheral surface of the motor housing 2 with a fixed gap around an outside of the motor rotor 8. A motor winding 10 is mounted on the motor stator 9.

A front end portion 5a of the motor shaft 5 protrudes forward from the front end bracket 3, and is connected to a load side via a reduction gear or the like. A rear end portion 5b of the motor shaft 5 protrudes rearward from the rear end bracket 4, and an absolute magnetic encoder 20 is disposed on the rear end portion 5b. The absolute magnetic encoder 20 is covered with an encoder cover 20a mounted on a rear end portion of the motor housing 2.

The absolute magnetic encoder 20 has an encoder rotor 23 provided with a first drum 21 and a second drum 22 that are fixed coaxially on the rear end portion 5b of the motor shaft 5, a first magnetic sensor group 24 disposed facing an external periphery of the first drum 21, a second magnetic sensor group 25 disposed facing an external peripheral surface of the second drum 22, and a signal processor 27 mounted on an encoder circuit board 26. A servo driver 40 of the servomotor 1 controls to drive the servomotor 1 in accordance with commands from a host system 50 on the basis of absolute signals or other signals output from the absolute magnetic encoder 20. The servo driver 40 has a receiver circuit unit 41 for receiving signals from the absolute magnetic encoder 20, and a control circuit unit 42 that includes a control computational circuit, a power drive circuit, and other components.

Figure 2:
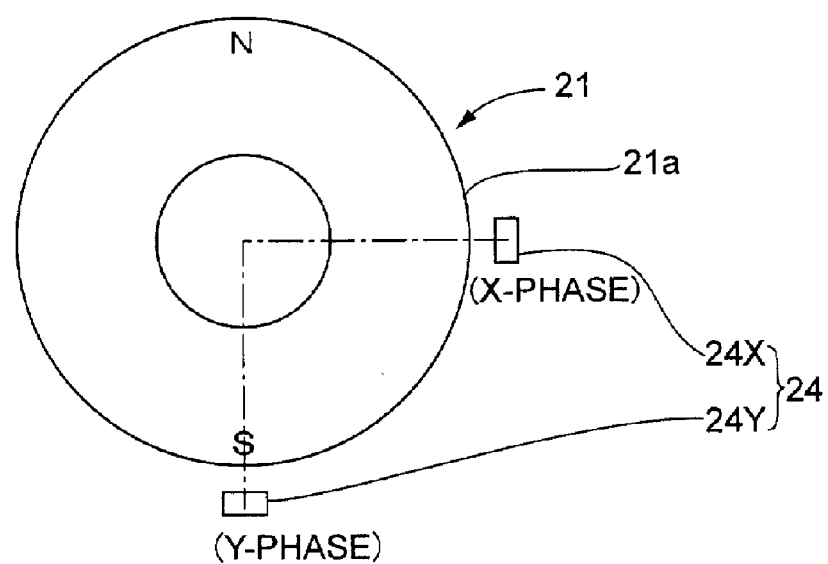
FIG. 2 is a schematic diagram showing a first drum and first magnetic sensor group of the absolute magnetic encoder of FIG. 1.
Figure 3:
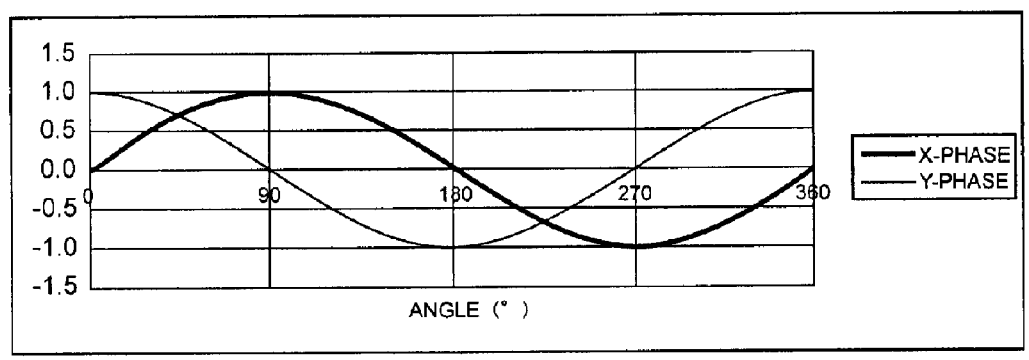
FIG. 3 is a signal waveform diagram showing X- and Y-phase signals obtained from the first magnetic sensor group of FIG. 2.

FIG. 2 is a diagram showing the first drum 21 and first magnetic sensor group 24. FIG. 3 is a signal waveform diagram showing detection signals of the first sensor group 24. The external peripheral surface of the first drum 21 is formed by a bipolar magnet 21a, and the first magnetic sensor group 24 disposed facing this external peripheral surface includes an X-phase sensor 24X and a Y-phase sensor 24Y in positions that differ in phase by 90°. Therefore, as shown in FIG. 3, X- and Y-phase signals can be obtained in the form of sinusoidal waves that are offset in phase by 90° as the first drum 21 rotates.

Figures 4A, 4B:
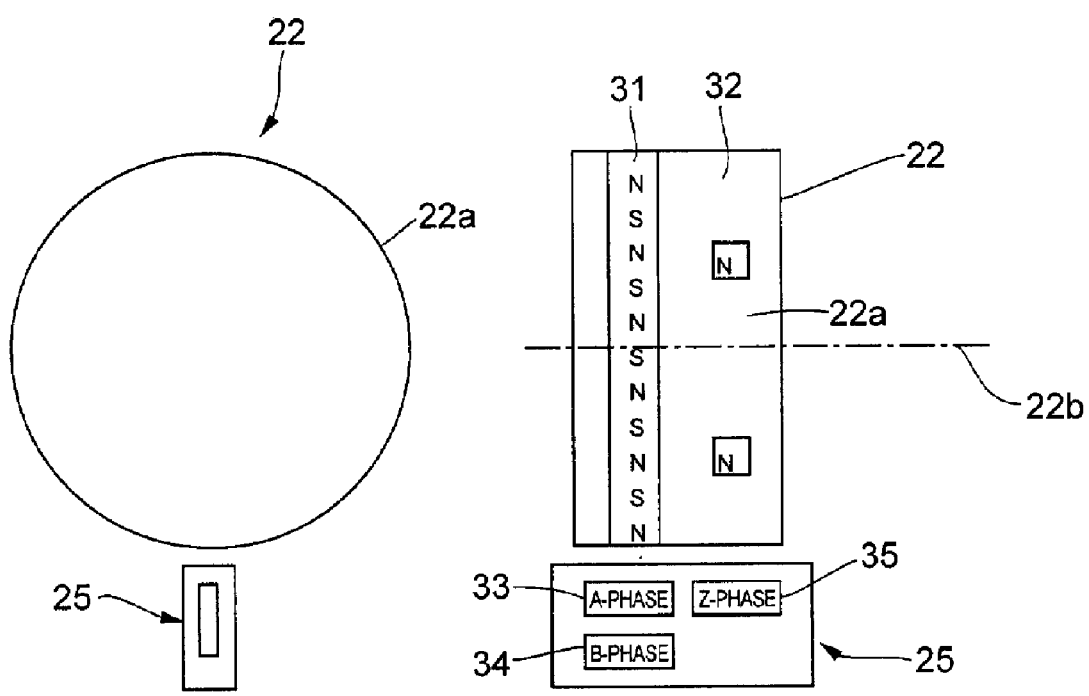
FIGS. 4A and 4B are front and side diagrams showing a second drum and second magnetic sensor group of FIG. 1.
Figure 5:
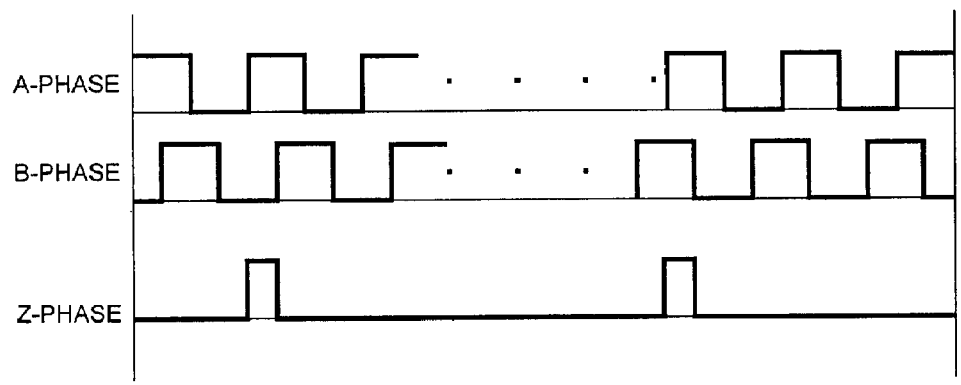
FIG. 5 is a signal waveform diagram showing A-, B-, and Z-phase signals obtained from the second magnetic sensor group of FIG. 4.

FIGS. 4A and 4B are front and side diagrams showing the second drum 22 and second magnetic sensor group 25. A multipolar track 31 and a reference track 32 are formed on an external peripheral surface 22a of the second drum 22 so as to be aligned in a direction of a drum axis 22b. The multipolar track 31 includes Q-bit (where Q is a positive integer) magnetic poles formed at equiangular spacing, and the reference track 32 includes Z (where Z is a positive integer) reference magnetic poles formed at equiangular intervals. The second magnetic sensor group 25 disposed facing the outside peripheral surface of the second drum 22 includes an A-phase magnetic sensor 33 and a B-phase magnetic sensor 34 disposed facing the multipolar track 31, and a Z-phase magnetic sensor 35 disposed facing the reference track 32. A-phase and B-phase magnetic signals that differ in phase by 90° are output from the A-phase magnetic sensor 33 and B-phase magnetic sensor 34, and Z-phase signals (reference signals) that indicate a position of the reference magnetic poles are output from the Z-phase magnetic sensor 35. FIG. 5 shows signal waveforms of these A-phase, B-phase, and Z-phase signals.

Figure 6:
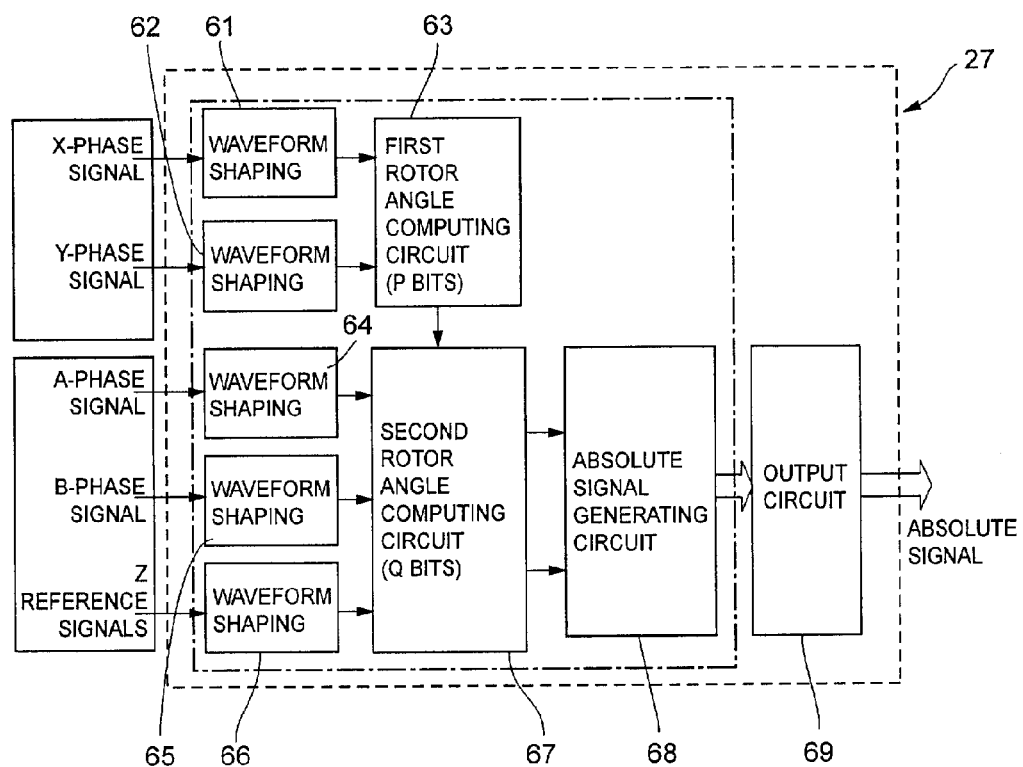
FIG. 6 is a schematic block diagram of a signal-processing unit of the absolute magnetic encoder of FIG. 1.

FIG. 6 is a schematic block diagram of the signal processor 27 of the absolute magnetic encoder 20. The signal processor 27 has waveform-shaping circuits 61 and 62 for the X-phase and Y-phase signals, and a first rotor angle computing circuit 63 for computing with precision $\alpha$ a rotational angle of an encoder rotor 23 on the basis of the X-phase and Y-phase signals after waveform shaping. The signal processor 27 has waveform-shaping circuits 64, 65, and 66 for shaping the waveforms of the A-phase, B-phase, and Z-phase signals (reference signal), respectively; a second rotor angle computing circuit 67 for computing with precision $\beta(>\alpha)$ the rotational angle of the encoder rotor 23 on the basis of the waveform-shaped signals and on the basis of the computational results of the first rotor angle computing circuit 63; and an absolute signal generating circuit 68 for generating an absolute signal that indicates an absolute position of the encoder rotor 23 on the basis of the computational results of the first and second rotor angle computing circuits 63 and 67. The absolute signal generated by the absolute signal generating circuit 68 is output to the servo driver 40 via an output circuit 69.

Figure 7:
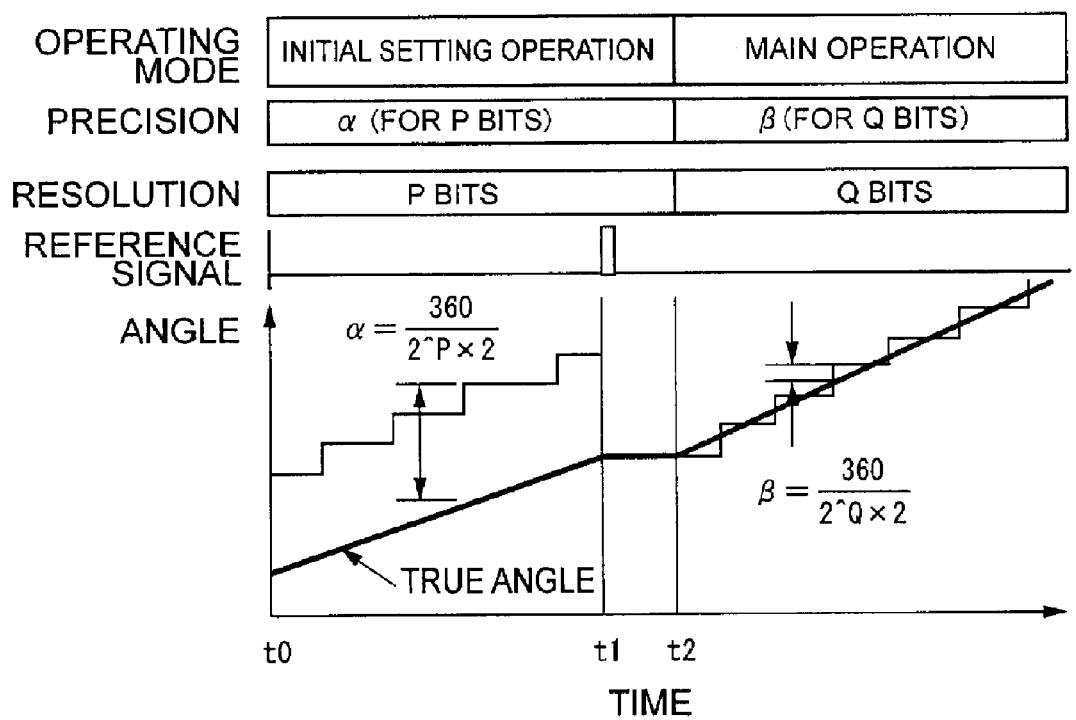
FIG. 7 is a diagram showing the operation of the absolute magnetic encoder of FIG. 1.

The detection operation of the absolute magnetic encoder 20 with this configuration is described with reference to FIG. 7. The absolute signal is generated at the initial startup of the servomotor 1, in other words, in the interval of time beginning from a time t0 when the rotation of the encoder rotor 23 rotating integrally with the motor shaft starts until a time t1 when the first reference signal Z is output, on the basis of the computational results of the first rotor angle computing circuit 63 and on the basis of the A- and B-phase signals. A detection precision at this time is $\alpha(=360/(2^P \times 2))$, and the resolution is P bits. That is to say, the absolute magnetic sensor 20 operates as an absolute encoder with precision $\alpha$ and a resolution of P bits.

When the initial reference signal Z is output, the second rotor angle computing circuit 67 corrects an absolute position on the basis of the reference signal Z, and from a time t2 after correction the absolute signal generating circuit 68 generates an absolute signal on the basis of the computational result of the second rotor angle computing circuit 67. Therefore, the absolute magnetic encoder 20 operates from the time t2 as an absolute encoder with precision $\beta(=360/(2^Q \times 2))$ and resolution Q. It should be noted that the number of reference signals Z per rotation is a positive integer that is 1 or greater, and the relationship between the bits is $2^Q > 2^P > Z$ Thus, in the absolute magnetic encoder 20 of the present example, X-phase and Y-phase signals which differ in phase by 90° and in which a single rotation represents a single period are generated using the bipolar magnet, and the absolute position of the rotor during initial operation until the reference signal Z is generated is detected using these signals and the A- and B-phase signals. After the reference signal Z has been generated, the absolute position of the encoder rotor 23 is detected with high precision using the X- and Y-phase signals together with the A- and B-phase signals and the reference signal Z. Therefore, even if the number of bits Q of the multipolar track 31 is increased in order to enhance the resolution, the number of magnetic pole tracks does not need to be proportionally increased. A resulting advantage is that a high-resolution encoder can be obtained without increasing the axial length, and motors and other rotational machines in which the encoder is mounted can be made smaller and more compact.

OTHER EMBODIMENTS

Figures 8A, 8B:
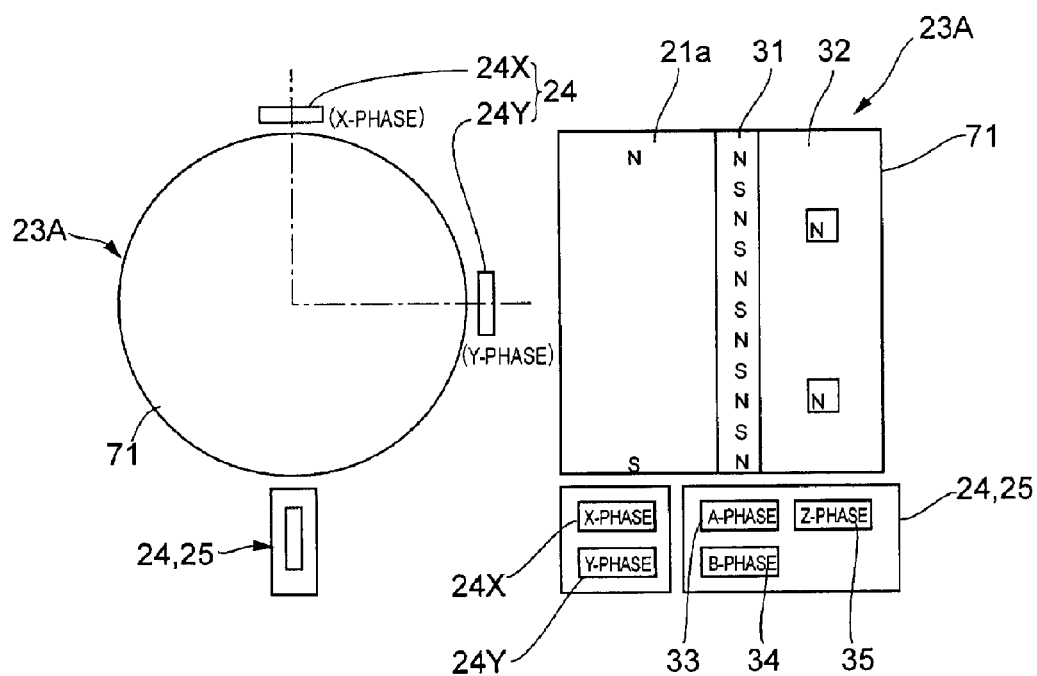
FIGS. 8A and 8B are front and side diagrams showing another aspect of a detection portion of the absolute magnetic encoder of FIG. 1.
Figures 9A, 9B:
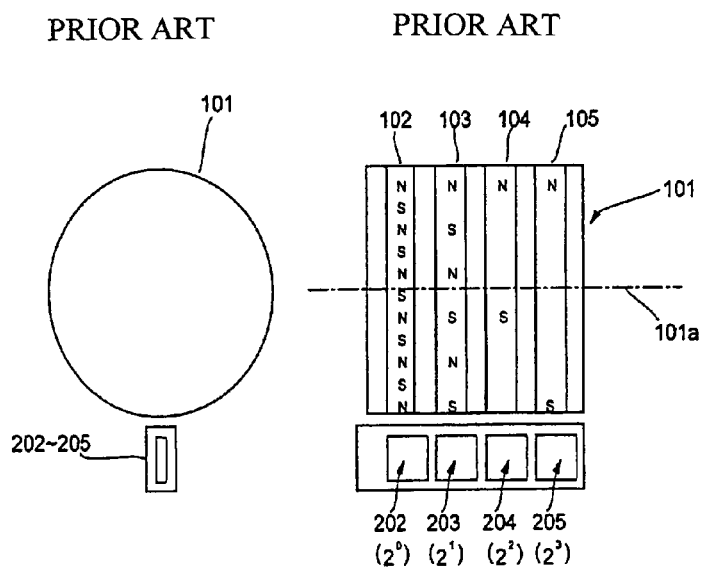
FIGS. 9A and 9B are front and side diagrams of a detection portion of a conventional absolute magnetic encoder.
Figure 10:
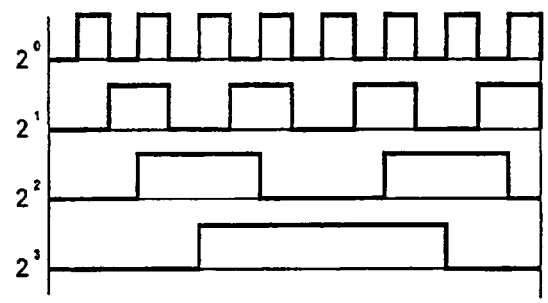
FIG. 10 is a signal waveform diagram showing signals obtained from the detection portion of FIG. 9.

The encoder rotor 23 in the above-described example is configured with the first drum 31 and the second drum 32. These may be formed instead as a single magnetic drum. FIGS. 8A and 8B are front and side diagrams showing an encoder rotor 23A comprising a single magnetic drum 71. In these diagrams, the same reference numerals are assigned to the portions that correspond to those in FIGS. 2 and 4.

What is claimed is:

1. An absolute magnetic encoder comprising:
    a rotor provided with a first drum and a second drum fixed coaxially to a rotational member to be measured;
    a bipolar magnet formed on an external peripheral surface of the first drum;
    a multipolar track having Q-bit, where Q is a positive integer, magnetic poles formed at equiangular intervals on an external peripheral surface of the second drum;
    a reference track having Z, where Z is a positive integer, reference magnetic poles formed at equiangular intervals on the external peripheral surface of the second drum;
    an X-phase magnetic sensor and a Y-phase magnetic sensor which are disposed facing the external peripheral surface of the first drum and which output an X-phase signal and Y-phase signal that differ in phase by 90°;
    an A-phase magnetic sensor and a B-phase magnetic sensor which are disposed facing an external peripheral surface of the multipolar track and which output an A-phase signal and B-phase signal that differ in phase by 90°;
    a Z-phase magnetic sensor which is disposed facing an external peripheral surface of the reference track and which outputs a reference signal for indicating a position of the reference magnetic poles;
    a first rotor angle computing circuit for computing with P bits a rotational angle of the rotor on the basis of the X-phase signal and Y-phase signal;
    a second rotor angle computing circuit for computing with Q bits the rotational angle of the rotor on a basis of computational results of the first rotor angle computing circuit and on a basis of the A-phase signal, B-phase signal, and Z-phase signal; and
    an absolute signal generating circuit for generating an absolute signal that indicates an absolute rotational position of the rotor on a basis of computational results of the first and second rotor angle computing circuits.

2. The absolute magnetic encoder according to claim 1, wherein the absolute signal generating circuit
    generates the absolute signal on the basis of the computational results of the first rotor angle computing circuit and on the basis of the A- and B-phase signals in an interval of time beginning from a start of rotation of the rotor until a time when a first reference signal is output;
    corrects the absolute rotational position on a basis of the first reference signal at the time the first reference signal is output; and
    after the first reference signal has been output, generates the absolute signal on the basis of the computational results of the second rotor angle computing circuit.

3. The absolute magnetic encoder according to claim 1 or 2, wherein the first drum and the second drum are formed as a single magnetic drum.

* * * * *